United States Patent
Evans

(10) Patent No.: US 10,322,791 B2
(45) Date of Patent: Jun. 18, 2019

(54) AIRCRAFT WING TORSION BOX, AIRCRAFT WING, AIRCRAFT AND SUPPORTING MEMBER FOR USE THEREIN

(71) Applicant: Airbus Operations Limited, Bristol (GB)

(72) Inventor: Steven Evans, Bristol (GB)

(73) Assignee: Airbus Operations Limited, Bristol (GB)

( * ) Notice: Subject to any disclaimer, the term of this patent is extended or adjusted under 35 U.S.C. 154(b) by 655 days.

(21) Appl. No.: 14/979,250

(22) Filed: Dec. 22, 2015

(65) Prior Publication Data

US 2016/0176499 A1   Jun. 23, 2016

(30) Foreign Application Priority Data

Dec. 22, 2014 (GB) .................................. 1422938.9

(51) Int. Cl.
*B64C 3/18* (2006.01)
*B64C 3/26* (2006.01)

(52) U.S. Cl.
CPC ................ *B64C 3/18* (2013.01); *B64C 3/185* (2013.01); *B64C 3/26* (2013.01)

(58) Field of Classification Search
CPC .................................... B64C 3/185; B64C 3/26
See application file for complete search history.

(56) References Cited

U.S. PATENT DOCUMENTS

| 5,332,178 A | * | 7/1994 | Williams .............. B29C 70/446 |
| | | | 244/123.3 |
| 6,638,466 B1 | | 10/2003 | Abbott |
| 6,776,371 B2 | | 8/2004 | Tanaka et al. |
| 7,922,957 B2 | | 4/2011 | Astwood et al. |
| 9,862,478 B2 | * | 1/2018 | Sanderson .............. B64C 3/182 |
| 2003/0042364 A1 | | 3/2003 | Tanaka et al. |
| 2009/0001630 A1 | | 1/2009 | Astwood et al. |
| 2010/0037998 A1 | | 2/2010 | Bray et al. |

FOREIGN PATENT DOCUMENTS

| EP | 0 199 914 | 11/1986 |
| EP | 0 199 914 A2 | 11/1986 |
| EP | 2 735 504 | 5/2014 |
| EP | 2 842 867 | 3/2015 |

(Continued)

OTHER PUBLICATIONS

Search Report in European Patent Application No. 15201605.1 dated Apr. 13, 2016 (2 pages).

(Continued)

*Primary Examiner* — Brian M O'Hara
(74) *Attorney, Agent, or Firm* — Nixon & Vanderhye P.C.

(57) ABSTRACT

An aircraft wing torsion box having a front associated with a leading portion of the wing torsion box and a rear associated with a trailing portion of the wing torsion box. The wing torsion box includes a support member having a front spar and a rear spar and a connecting portion between the front and rear spars, the connecting portion includes at least one interposing spar, at least one portion of upper wing skin; and at least one portion of lower wing skin, and at least one portion of the upper wing skin and at least one portion of the lower wing skin being supported by the support member.

27 Claims, 4 Drawing Sheets

(56) References Cited

FOREIGN PATENT DOCUMENTS

| | | |
|---|---|---|
| FR | 2 863 542 | 6/2005 |
| GB | 1312543 | 4/1973 |
| GB | 2 410 921 | 8/2005 |
| GB | 2475523 A | 5/2011 |
| JP | 58-56824 | 4/1983 |
| JP | H11 99993 A | 4/1999 |
| WO | 02/074469 | 9/2002 |

OTHER PUBLICATIONS

Search Opinion in European Patent Application No. 15201605.1 circa dated Apr. 13, 2016 (4 pages).
"Eurofighter Typhoon", Eurofighter Technology and Performance: Structure, http://typhoon.starstreak.net/Eurofighter/stucture.html, four pages Nov. 27, 2015.
"JAXA Technology Challenge", Japan Aerospace Exploration Agency, Mar. 31, 2009, 94 pages.
"Vacman's Notes", Vacmobiles.com, four pages, Updated Jun. 2012.
IPO Search Report cited in GB 1422938.9, dated Jun. 12, 2015, three pages.

\* cited by examiner

AIRCRAFT WING TORSION BOX, AIRCRAFT WING, AIRCRAFT AND SUPPORTING MEMBER FOR USE THEREIN

BACKGROUND OF THE INVENTION

This application claims priority to United Kingdom (GB) patent application 1422938.9 filed Dec. 22, 2014, the entirety of which is incorporated by reference.

BACKGROUND OF THE INVENTION

The present disclosure relates to an aircraft wing box, in particular an aircraft wing torsion box (also referred to as a wing box).

The present invention concerns aircraft. More particularly, but not exclusively, this invention concerns an aircraft wing torsion box. The invention also concerns an aircraft wing, an aircraft comprising such an aircraft wing torsion box or aircraft wing and a support member for use in such an aircraft wing torsion box or aircraft wing.

A conventional wing torsion box comprises separate front and rear wing spars extending along the length of the wing box, with ribs extending between the front and rear wing spars, with separate rib-spar posts being provided to help hold the spars and ribs together. Separate stringers run the length of the wing box. Upper and lower skins cover substantially the entire upper and lower surfaces of the wing box. Such wing boxes are complex and comprise many individual components. Assembly time for the wing box can be long.

To permit access to the interior of the wing, a manhole may be provided in the lower wing skin. A strip of reinforcement (often known as a "manhole plank") is provided to the wing skin to support the manhole. Such an arrangement may be heavy, which is undesirable.

Furthermore, the conventional wing box typically requires a large number of fasteners (such as bolts) which present a large number of point targets on the exterior of the aircraft for lightning strikes.

The present invention seeks to mitigate one or more of the above-mentioned problems. Alternatively or additionally, the present invention seeks to provide an improved wing box, wing and/or support member for use therein.

SUMMARY OF THE INVENTION

The present invention provides, according to a first aspect, an aircraft wing box having a front associated with a leading portion of the wing box and a rear associated with a trailing portion of the wing box, the wing box comprising:

a support member comprising a front spar and a rear spar and a connecting portion between the front and rear spars, the connecting portion comprising at least one interposing spar, at least one portion of upper wing skin; and
at least one portion of lower wing skin,
at least one portion of the upper wing skin and at least one portion of the lower wing skin being supported by the support member.

The wing box of the present invention may provide a simpler wing box by using a support member that provides support to upper and lower wing skins. For the avoidance of doubt, the wing box is an aircraft wing torsion box.

Those skilled in the art will realise that a leading portion of the wing box is that which, in use, is forward of the trailing portion of the wing box. Likewise, those skilled in the art will realise that a wing box by its very nature has a natural orientation which defines upper and lower orientations.

The supporting member is optionally elongate. The supporting member optionally has a length of 10-40 m (meter), optionally from 10-25 m, optionally from 12-25 m and optionally from 15-20 m. Optionally, the supporting member extends in a direction generally parallel to the length of the wing box.

The wing box typically extends from a root region which in use is associated with (and proximate to) the fuselage of the aircraft to a tip region which in use is associated with (and proximate to) a wing tip. Those skilled in the art will realise that the fuselage and wing tip are not part of the wing box of the present invention.

Optionally, the supporting member extends from the root region of the wing box to the tip region of the wing box.

The support member optionally comprises at least two (and optionally no more than four) interposing spars. The word "interposing" indicates that the spars are located between the front and rear spars.

The support member may have the same general cross-sectional shape along its length (although the size of the support member will typically be smaller closer to the tip region of the wing box).

Adjacent spars may be connected by a bridging portion. This does not in any way indicate that the spars and bridging portions are made separately and then attached together. Indeed, the supporting member may typically be made as a single piece. Given that the supporting member may comprise at least three spars, the supporting member may comprise two or more bridging portions, the bridging portions connecting adjacent spars. If the supporting member comprises four spars, for example (front spar, rear spar and two interposing spars), the supporting member may comprise three bridging portions. The supporting member may comprise two upper bridging portions and one lower bridging portion, or the supporting member may comprise two lower bridging portions and one upper bridging portion. If the supporting member comprises two lower bridging portions and one upper bridging portion, then the supporting member may comprise a front spar being connected to a first lower bridging portion, the first lower bridging portion being connected to a first interposing spar which is connected to a first upper bridging portion, the first upper bridging portion being connected to a second interposing spar, the second interposing spar being connected to a second lower bridging portion which is connected to the rear spar. Such an arrangement may be said to have a general W shape.

If the supporting member comprises two upper bridging portions and one lower bridging portion, then the supporting member may comprise a front spar being connected to a first upper bridging portion, the first upper bridging portion being connected to a first interposing spar which is connected to a first lower bridging portion, the first lower bridging portion being connected to a second interposing spar, the second interposing spar being connected to a second upper bridging portion which is connected to the rear spar. Such an arrangement may be said to have a general M shape.

The bridging portions are not necessarily the same width (as defined by the separation of adjacent spars).

One or more spars may be provided with an access aperture (optionally with a closure for the controlled opening and closing of the access aperture) for access to a space at least partially defined by said spar. For example, the access aperture is typically provided in a spar which supports a portion of wing skin which is removable, the wing skin portion being removable to permit access to the access aperture.

The angle of each spar may be mutually different from other spars. For example, the front and rear spars may be generally more upright than the interposing spars. The interposing spars may be less upright to provide easy access to compartments within the wing box. For example, the interposing spars may deviate by up to 45 degrees from the vertical. One or more of the front spar, rear spar and interposing spar(s) may be curved in cross-section. One or more of the front spar, rear spar and interposing spar(s) may be S-shaped in cross-section. For example, one or more of the front spar, rear spar and interposing spar(s) may be sigmoid in cross-section.

At least one of (optionally more than one of and optionally each of) the front spar, rear spar, interposing spar(s) and bridging portion(s) are optionally elongate. At least one of (optionally more than one of and optionally each of) the front spar, rear spar, interposing spar(s) and bridging portion(s) optionally has a length of 10-40 m, optionally from 10-25 m, optionally from 12-25 m and optionally from 15-20 m. Optionally, at least one of (optionally more than one of and optionally each of) the front spar, rear spar, interposing spar(s) and bridging portion(s) extend in a direction generally parallel to the length of the wing box.

Optionally, at least one of (optionally more than one of and optionally each of) the front spar, rear spar, interposing spar(s) and bridging portion(s) extend from the root region of the wing box to the tip region of the wing box.

The spars typically extend substantially across the height of the wing box.

Portions of wing skin are typically supported by one or more of the said spars, typically by at least two of said spars. At least one portion of wing skin may be integral with the supporting member. At least one portion wing skin (preferably a portion of lower wing skin) is removable relative to the supporting member. For example, a portion of wing skin may be in the form of a removable panel. The removable panel may provide access to the interior of the wing box without the need for a manhole formed in a manhole plank.

At least one upper wing skin portion extends between adjacent spars. An upper wing skin portion may cross more than two spars, for example across the front, rear and any interposing spars.

The front spar may have a first end associated with the connecting portion and a second end remote from the connecting portion, the supporting member comprising a flange extending forward from the second end of the front spar. The flange is typically elongate and extends along the length of the front spar. The rear spar may have a first end associated with the connecting portion and a second end remote from the connecting portion, the supporting member comprising a flange extending rearwards from the second end of the rear spar. The flange is typically elongate and extends along the length of the rear spar. The front and rear spar flanges may be located above the first ends of the respective spars. One or both of the front spar flange and rear spar flange may form an external structural surface of the wing (subject to covering with typical coverings, such as paint and/or lightning dissipative sheet). Alternatively, one or more wing skin portions may extend across one or both of the front and rear spar flanges. For example, a single wing skin portion (optionally an upper wing skin portion) may extend across both the front and rear spar flanges. Alternatively, a wing skin portion may extend across the front, rear and interposing spars, but not across the front and rear spar flanges.

The wing box may comprise two upper wing skin portions, a first extending from the front spar to an adjacent spar, and a second upper wing skin portion extending from the rear spar to an adjacent spar. In this case, an upper bridging portion between two spars may provide an external structural wing surface (subject to covering with typical coverings, such as paint and/or lightning dissipative sheet).

The wing box may comprise a lower skin portion extending from a first interposing spar to a second interposing spar. In this case, the wing box may comprise a plurality of lower wing skin portions extending from a first interposing spar to a second interposing spar, at least one of the plurality of wing skin portions being removable to provide access to the interior of the wing box. In this case, two lower bridging portions adjacent to the lower wing skin portion, one either side of the lower wing skin portion, provide as external structural wing surface (subject to covering with typical coverings, such as paint and/or lightning dissipative sheet).

Alternatively, the wing box may comprise a lower wing skin which extends across the front, rear and interposing spars.

An upper wing skin portion may extend between adjacent spars, with two adjacent bridging portions (one either side of the upper sing skin portion) providing an external structural wing surface (subject to covering with typical coverings, such as paint and/or lightning dissipative sheet).

The wing box may comprise two lower wing skin portions, a first extending from the front spar to an adjacent spar, and a second extending from the rear spar to an adjacent spar. In this case, a lower bridging portion between two spars may provide an external structural wing surface (subject to covering with typical coverings, such as paint and/or lightning dissipative sheet). At least one of the lower wing skin portions may be removable to permit access to the interior of the wing box from below the wing box.

The wing box may comprise an upper wing skin portion extending from a first interposing spar to a second interposing spar. In this case, the wing box may comprise a at least one upper wing skin portions extending from a first interposing spar to a second interposing spar. In this case, two upper bridging portions adjacent to the upper wing skin portion, one either side of the upper wing skin portion, provide an external structural wing surface (subject to covering with typical coverings, such as paint and/or lightning dissipative sheet).

The wing box may comprise one or more ribs. Said ribs typically extend from the front spar to the rear spar. Such ribs typically extend substantially across the spars, thereby providing a strong wing structure. The ribs may, with the spars and wing skins, define compartments in the wing box, one or more of which may be adapted for the storage of aircraft fuel. It is anticipated that at least one of said compartments may be a "dry" compartment which will not contain fuel. Such "dry" compartments may be used to separate fuel-containing compartments.

Alternatively, the wing box may comprise one or more braces which extend between adjacent spars. One or more of the braces may be substantially orthogonal to the support member. One or more of the braces may comprise a substantially planar, flat portion extending between adjacent spars, the substantially planar, flat portion optionally being substantially orthogonal to the support member. For example, a first brace may extend from the front spar to a first interposing spar, a second brace may extend from the first interposing spar to a second interposing spar and a third brace may extend from the second interposing spar to the rear spar.

One or more of the braces is typically attached to the respective spar. For example, the supporting member may comprise one or more attachment points for attachment of a brace.

One or more ribs may be integrally formed with the supporting member.

One or more of the wing skin portions may be integrally formed with the supporting member.

The wing box may be provided with one or more stringers. The one or more stringers may optionally extend along the length of the wing box. One or more stringers may optionally be integrally formed with the supporting member.

The supporting member is optionally formed from composite material. The supporting member may be made using so-called "dry fibre" techniques or fabric infused with resin, both of which are well-known to those skilled in the art. Dry fibre techniques involve separate supply of the fibre and resin. Typically, a laminate comprising layers of porous fabric is formed, the laminate then being impregnated with resin or resin precursor. Pressure in then applied to compress the impregnated laminate into the desired shape. This may be done using outer and inner moulding line tools. Alternatively, a mould tool and vacuum bag may be used. The use of such moulds and vacuum bags is very well known to those skilled in the art. Alternatively, the supporting member may be formed using fabric which is pre-impregnated with resin or resin precursor (often known as "pre-preg"), but this may be less desirable if any ribs or the like are to be integrated into the supporting member.

According to a second aspect of the invention there is also provided an aircraft wing comprising a support member comprising a front spar and a rear spar and a connecting portion between the front and rear spars, the connecting portion comprising at least one interposing spar, at least one portion of upper wing skin; and at least one portion of lower wing skin, at least one portion of the upper wing skin and at least one portion of the lower wing skin being supported by the support member.

The aircraft wing may optionally comprise a horizontal tail plane. The aircraft wing may comprise a vertical tail plane. The supporting member may have the same features as the supporting member described above in relation to the wing box of the first aspect of the present invention. The aircraft wing may comprise an aircraft wing box in accordance with the first aspect of the present invention. The aircraft wing may comprise the aircraft wing box in accordance with the first aspect of the present invention and one or more control surfaces, such as one or more of a slat, spoiler (in-flight or ground spoiler), aileron, leading edge flap or trailing edge flap. The aircraft wing may comprise a wing tip. The wing tip may be provided with a wing tip device, such as a winglet; such winglets may be generally upwardly extending.

According to a third aspect of the present invention, there is also provided an aircraft comprising a wing box according to the first aspect of the present invention and/or a wing in accordance with the second aspect of the present invention. The aircraft may optionally be a single aisle aircraft. The aircraft is optionally heavier than 25 tonnes dry weight, optionally heavier than 30 tonnes dry weight and optionally heavier than 30 tonnes dry weight and more optionally no more than 100 tonnes dry weight. The aircraft is optionally of a size equivalent to an aircraft designed to carry more than 75 passengers, optionally no more than 350 passengers, optionally no more than 300 passengers, optionally no more than 250 passengers and optionally no more than 200 passengers. The aircraft optionally has a fuselage diameter or width of more than 3 m, optionally more than 3.5 m, optionally no more than 5 m, optionally no more than 4.5 m and optionally no more than 4.2 m.

According to a fourth aspect of the present invention, there is also provided a support member for use in the wing box of the first aspect of the present invention and/or the wing of the second aspect of the present invention. The support member may comprise those features described above in relation to the wing box of the first aspect of the present invention.

It will of course be appreciated that features described in relation to one aspect of the present invention may be incorporated into other aspects of the present invention. For example, the support member of the fourth aspect of the present invention may incorporate any of the features described with reference to the wing box of the first aspect of the present invention and vice versa.

DESCRIPTION OF THE DRAWINGS

Embodiments of the present invention will now be described by way of example only with reference to the accompanying schematic drawings of which.

DETAILED DESCRIPTION

Figure 1:
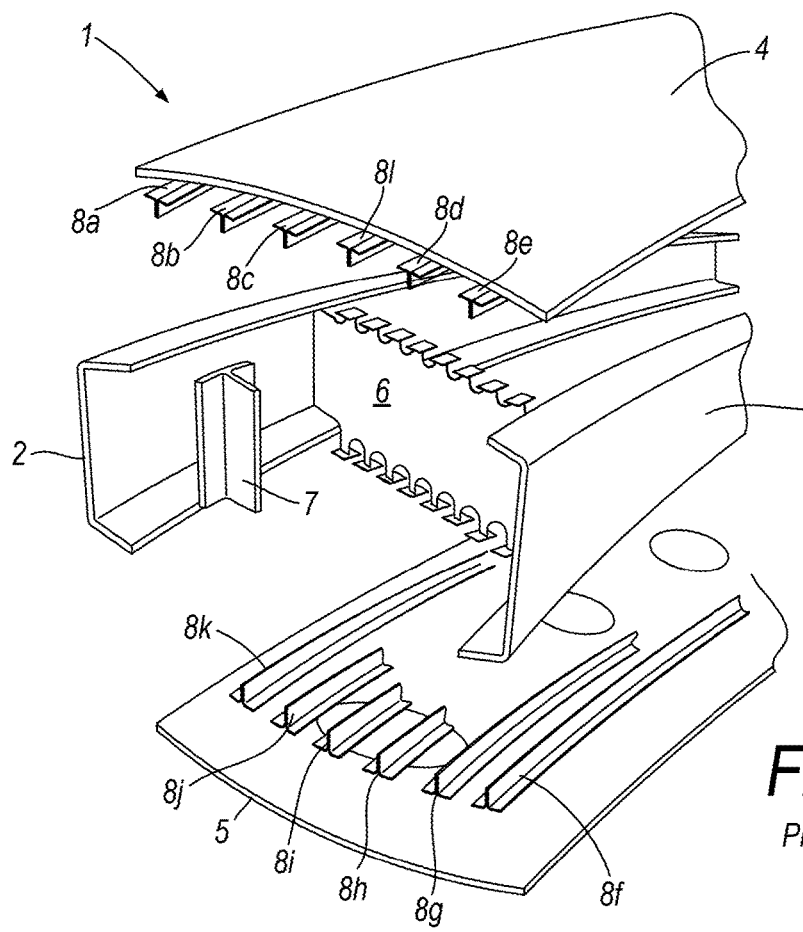
FIG. 1 shows an exploded view of a conventional prior art wing torsion box.

FIG. 1 shows a known wing box 1 (also referred to as a wing torsion box) comprising a front spar 2 and rear spar 3 which support upper and lower wing skins 4, 5. Ribs 6 (a representative one of which is shown) extend rearward from the front of the wing box 1. Each rib is attached to a rib-spar post 7, a representative one of which is shown. The rib-spar post 7 is attached to a respective spar 2. Stringers 8*a* to 8*l* provide structural support to the wing skins 4, 5. The stringers are attached to the ribs 6.

FIG. 1 shows that the known wing box is complex and involves the attachment of many different discrete components which is time-consuming. Furthermore, the attachment of many different components requires the use of many bolts, resulting in the exterior of the aircraft having many bolt heads, providing many potential lightning strike sites.

Figure 2:
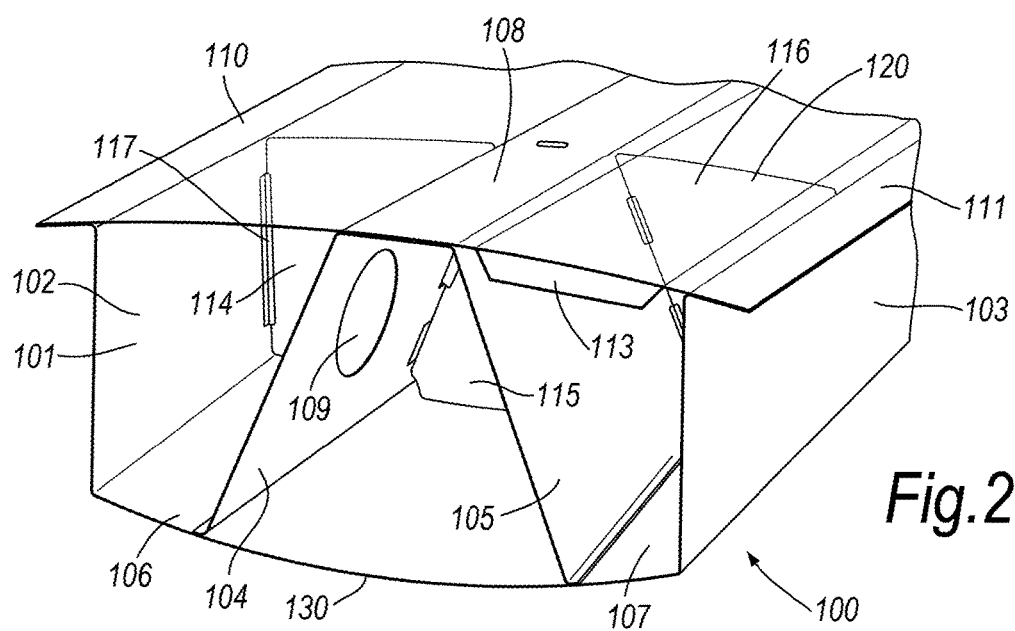
FIG. 2 shows a "see through" view of an example of a wing torsion box in accordance with an embodiment of the present invention.

FIG. 2 is a schematic "see through" perspective view of a wing box (being a wing torsion box) in accordance with an embodiment of the present invention. The wing box is denoted generally by reference numeral 100. The wing box 100 is elongate and extends from a root region which in use is proximate to the fuselage of an aircraft to a tip region which in use is proximate to a wing tip. The wing box 100 comprises a supporting member 101. The supporting member 101 is elongate and extends along the length of the wing box from the wing box root region to the wing box tip region. The supporting member is generally W shaped in cross-section, and has substantially the same cross-sectional shape along the entire length of the supporting member. The wing box and the supporting member may each be about 15 m long, as is commensurate for a single aisle passenger aircraft carrying about 100-150 passengers.

The supporting member 101 comprises a front spar 102 and a rear spar 103, connected by a connecting portion, the connecting portion comprising two interposing spars 104, 105, two lower bridging portions 106, 107, and an upper bridging portion 108. The front spar 102, rear spar 103, two interposing spars 104, 105, two lower bridging portions 106, 107, upper bridging portion 108, and the front 110 and rear 111 spar flanges are all elongate and extend along the length of the wing box, from the root region to the tip region of the wing box. The supporting member further comprises front 110 and rear 111 spar flanges The arrangement of the supporting member 101 will now be described. The front spar 102 is substantially vertical. The front spar flange 110 extends forward of one end of the front spar. The other end of the front spar 102 is attached to a lower bridging portion 106 which extends rearwardly from the front spar 102 to one end of an interposing spar 104. The interposing spar 104 extends upwards from the lower bridging portion 106 at an angle of about 30 degree, e.g., in a range of 25 to 35 degrees, from the vertical to the upper bridging portion 108. The upper bridging portion extends rearwardly from interposing spar 104 to interposing spar 105. Interposing spar 105 extends downwards at an angle of about 30 degrees, e.g., within a range of 25 to 35 degrees, from the vertical to the lower bridging portion 107. This lower bridging portion 107 extends rearwardly to the rear spar 103 which is provided with a rearwardly extending rear spar flange 111.

The wing box is provided with an upper wing skin 120 which extends along the whole length of the wing box and extends across the front 102, rear 103 and interposing 104, 105 spars, as well as across the upper bridging portion 108 and the front 110 and rear 111 spar flanges.

A stiffener 113 is provided to increase the stiffness of the wing skin 120.

The supporting member 101 is very strong and provides much support to the wing skin 120 which is supported by the spars, the spar flanges and the upper bridging portion. The wing box may not, therefore, require stringers. Furthermore, the bridging portions between the spars provide stiffness to the wing box, and may render unnecessary ribs which would conventionally provide stiffness. Whilst in some cases it may be possible to dispense with any form of additional bracing across the width of the wing box, in the present embodiment, the wing box comprises braces 114, 115, 116 disposed between adjacent spars and aligned transversely, e.g., orthogonally, to the spars. The braces 114, 115, 116 provide increased support across the width of the wing box 100. Brace 114 is located between front spar 102 and interposing spar 104. Brace 115 is located between interposing spars 104, 105. Brace 116 is located between interposing spar 105 and rear spar 103. Each of the braces is attached to a spar-brace post, one of which is shown 117. In this case, the spar-brace posts are integral with the supporting member 101.

Figure 4A:
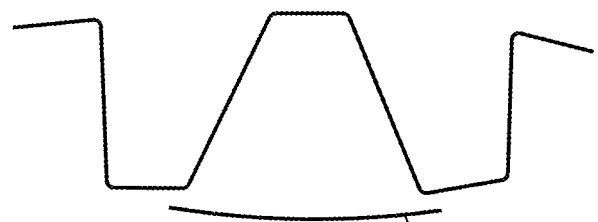
FIG. 4A shows a schematic cross-sectional view of a further example of a wing torsion box in accordance with the present invention.
Figure 4B:
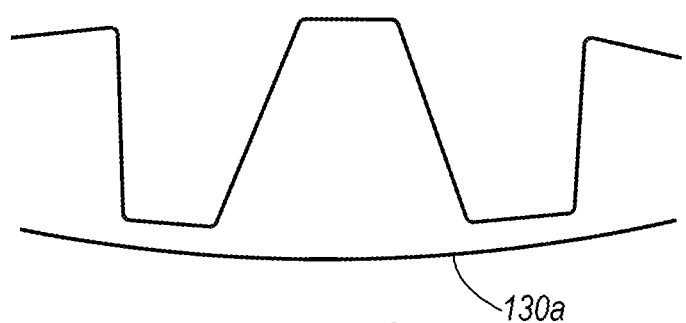
FIG. 4B shows a schematic cross-sectional view of a further example of a wing torsion box in accordance with the present invention, with a different lower wing skin arrangement from the wing torsion box of FIG. 4A.

FIG. 4a shows a lower wing skin 130 extending between, and supported by, the two interposing spars 104, 105. The interface between the lower wing skin 130, the spar and the adjacent lower bridging portion is shown in more detail in FIG. 5.

Figure 5:
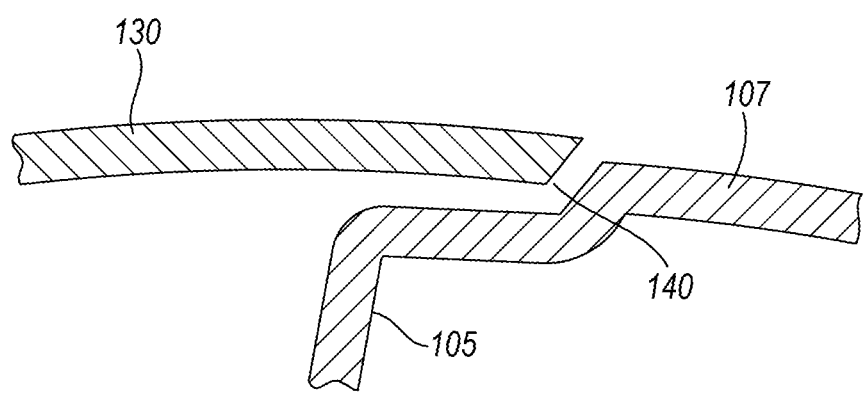
FIG. 5 shows a simplified cross-sectional view through a joint region involving a spar and a portion of wing skin.

FIG. 5 shows that the supporting member 101 is shaped to provide a recess 140 for the receipt of an edge end of the wing skin 130. The recess accommodates the wing skin 130 so that the wing skin 130 is supported by the spar, and so that an external surface of the wing skin 13 is substantially flush with external surface of the adjacent lower bridging portion 107. In this case, the lower bridging portions form an external structural surface of the wing box. Those skilled in the art will realise that the external surfaces of the lower bridging portions may be coated or covered like a normal wing skin may be coated or covered, for example, by a lightning dissipative sheet and/or paint.

A portion of the lower wing skin 130 may be removable so as to permit access to the space defined by the two interposing spars 104, 105 and the underside of the upper bridging portion 108. There is therefore no need for a thickened region of wing skin, typically known as a manhole plank, which is conventionally required if an access hole is to be provided in a wing skin. Such manhole planks are heavy and therefore undesirable. Interposing spar 104 is provided with an aperture 109 for access into the compartment defined by the front spar 102, the upper wing skin 120, a lower bridging portion 106 and the interposing spar 104.

The supporting member 101 may essentially be a unitary piece i.e. it is one piece. It is made from a composite material, by impregnating a laminate of porous fabric with a resin. Pressure is applied to the impregnated laminate using inner and outer moulding line tools, such tools being well-known to those skilled in the art and the resin is hardened while pressure is being applied using the mould tools. This process, known as resin or vacuum infusion, is well known to those skilled in the art and is described in "Vacman's notes", www.vacmobiles.com/resin_infusion.html.

In this case, the braces are formed from composite material by conventional methods known to those skilled in the art. The braces are, in this case, made separately from the supporting member, but may be made integrally with the supporting member.

The lower and upper wing skins are made of aluminium, as is conventional for wing skins. The wing skins are attached to the supporting member using bolts and other methods well known to those skilled in the art.

The wing box may be adapted to contain fuel and thus be a "wet wing". Such adaptations are well-known to those skilled in the art of wing construction.

Figure 3A:
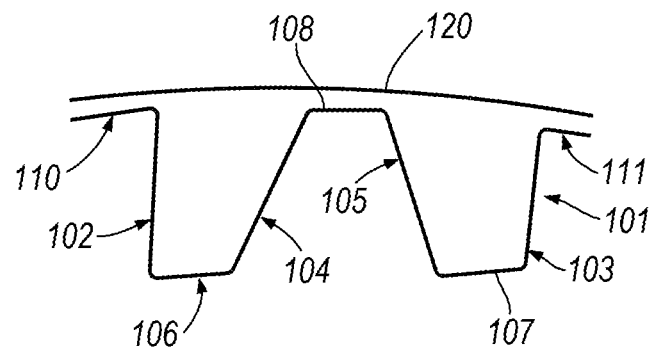
FIG. 3A shows a schematic cross-sectional view of a further example of a wing torsion box in accordance with the present invention.
Figure 3B:
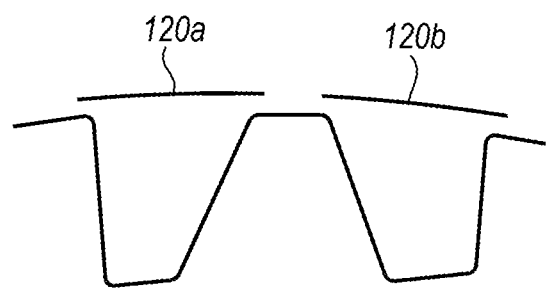
FIG. 3B shows a schematic cross-sectional view of a further example of a wing torsion box in accordance with the present invention, with a different upper wing skin arrangement from the wing box of FIG. 3A.

The wing box 101 of FIG. 2 has an upper wing skin arrangement shown in FIG. 3A and a lower wing skin arrangement shown in FIG. 4A. Alternative arrangements of wing skins will now be described with reference to FIGS. 3A to 3C and 4A and 4B. For example, FIG. 3B shows two wing skin portions, 120a, 120b, each of which extends across two (and only two) adjacent spars. Front 110 and rear 111 spar flanges and upper bridging portion 108 form part of the outer surface of the wing box.

Figure 3C:
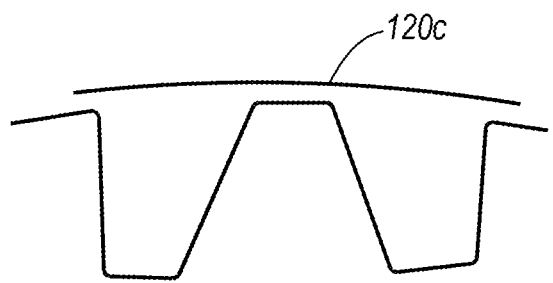
FIG. 3C shows a schematic cross-sectional view of a further example of a wing torsion box in accordance with the present invention, with a different upper wing skin arrangement from the wing torsion boxes of FIGS. 3A and 3B.

FIG. 3C shows a single upper wing skin portion 120*c* which extends across the front, rear and interposing spars and upper bridging portion 108, but not across the front and rear spar flanges. Front 110 and rear 111 spar flanges form part of the outer surface of the wing box. FIG. 4C shows a lower wing skin arrangement in which lower wing skin 130*a* extends across front, rear and interposing spars, and across the two lower bridging portions. Any of the upper wing skin arrangements of FIGS. 3A, 3B and 3C may be used with either of the lower wing skin arrangements of FIGS. 4A and 4B.

Figure 6:
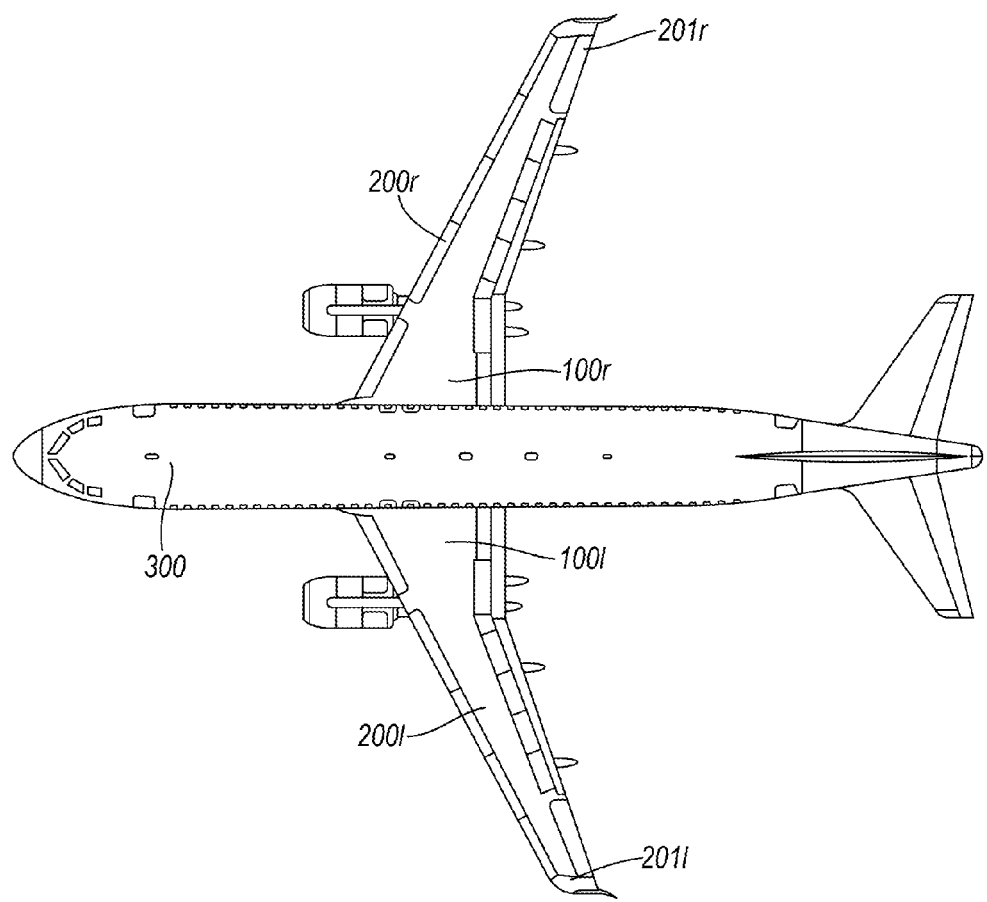
FIG. 6 shows a plan view of an example of an aircraft and an aircraft wing according to an embodiment of the present invention.

FIG. 6 shows an aircraft 300 in accordance with an embodiment of the present invention. The aircraft 300 is a single aisle aircraft, and comprises left 200*l* and right 200*r* wings in accordance with an embodiment of the present invention. Each of the wings 200*l*, 200*r* comprises a wing box 100*l*, 100*r* as described above with reference to FIG. 2 and a respective wing tip 201*l*, 201*r*. Each wing box 100*l*, 100*r* extends from a root region proximate to the aircraft fuselage to a tip region, the wing tip 201*l*, 201*r* being attached to the tip region of the wing box 200*l*, 200*r*.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above describe the use of a laminate of dry fabric which is subsequently impregnated with resin or resin precursor which is then cured or otherwise treated to make the support member, with inner and outer moulding line tools being used. Those skilled in the art will realise that for so-called "dry fibre" or "dry fabric" composite materials (in which the fibre or fabric is supplied separately from the resin precursor), many different techniques (such as resin transfer moulding, resin transfer infusion and resin film infusion) may be used to make the support member. Those skilled in the art will also realise that other composite materials may be used, such as those formed from fabrics pre-impregnated with resin precursor (often known to those skilled in the art as "pre-preg"). SQRTM (same qualified resin transfer moulding) may, for example, be used to form the support member from pre-preg. The techniques described above are well known to those skilled in the art. For example, the manufacture of aircraft components using one or more of the techniques mentioned above is disclosed in WO02/074469, US2003/042364 and U.S. Pat. No. 7,922,957.

Those skilled in the art will realise that the support member need not be made from composite material.

The examples above describe a wing box for use on a single aisle commercial passenger aircraft. Wing boxes may be made for other aircraft, such as multi-aisle aircraft and consequently the dimensions of the wing box may be varied accordingly.

The examples above describe how the ribs are provided separate from the support member. One or more of the ribs may be provided integrally with the support member.

The examples above describe how the upper and lower wing skins are provided separate from the support member. One or more of the wing skins may be provided integrally with the support member.

The examples above describe a main lift-providing wing. A vertical tail plane or horizontal tail plane may be provided with a support member as described for a main wing.

The examples above demonstrate the use of a supporting member that has two interposing spars. Those skilled in the art will realise that other numbers of interposing spars are possible. For example, the supporting member may comprise four interposing spars. Such a supporting member would then have two upper bridging portions and three lower bridging portions.

The examples above demonstrate the use of a supporting member that is generally W shaped. Other shapes are possible. For example, the supporting member may, in use, be M shaped, with two upper bridging portions and one lower bridging portion.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention is:

1. An aircraft wing torsion box including a front associated with a leading portion of the wing torsion box and a rear associated with a trailing portion of the wing torsion box, the wing torsion box further comprising:
   a support member including a front spar and a rear spar, and a connecting portion between the front and rear spars, wherein the connecting portion comprises at least one interposing spar,
   at least one portion of an upper wing skin; and
   at least one portion of a lower wing skin,
   wherein the at least one portion of the upper wing skin and the at least one portion of the lower wing skin being supported by the support member;
   wherein a portion of the support member forms an upper or lower external structural surface and the portion is uncovered by the upper wing skin and by the lower wing skin, and
   wherein the at least one interposing spar spans between the upper wing skin and the lower wing skin.

2. The aircraft wing torsion box according to claim 1 wherein the supporting member is elongate and extends in a direction parallel to a length of the wing torsion box.

3. The aircraft wing torsion box according to claim 2 wherein a cross sectional shape of the support member remains constant along a length of the support member.

4. The aircraft wing torsion box according claim 1 wherein the wing box extends from a root region proximate to an aircraft fuselage to a wing tip region, the supporting member extending from the root region to the wing tip region.

5. The aircraft wing torsion box according to claim 1 wherein at the spars include at least one pair of adjacent spars connected by a bridging portion.

6. The aircraft wing torsion box according to claim 1 wherein the supporting member comprises bridging portions, and each of the bridging portions connecting an adjacent pair of the spars.

7. The aircraft wing torsion box according to claim 6 wherein the support member comprises the front spar, the rear spar and two interposing spars, and three bridging portions, each bridging portion connecting a pair of adjacent spars.

8. The aircraft wing torsion box according to claim 7 wherein the supporting member comprises a front spar being connected to a first lower bridging portion, the first lower bridging portion being connected to a first interposing spar which is connected to a first upper bridging portion, the first upper bridging portion being connected to a second interposing spar, the second interposing spar being connected to a second lower bridging portion which is connected to the rear spar.

9. The aircraft wing torsion box according to claim 1 wherein the front and rear spars are more upright than the interposing spar.

10. The aircraft wing torsion box according to claim 1 comprising at least one portion of wing skin, at least one portion of wing skin being supported by one or more spar, at least one portion of wing skin being integral with the supporting member.

11. The aircraft wing torsion box according to claim 1 comprising at least one upper wing skin portion which extends between adjacent spars and at least one lower wing skin portion which extends between adjacent spars.

12. The aircraft wing torsion box according to claim 11 wherein the at least one upper wing skin portion or the at least one lower wing skin portion is supported by the front, rear and interposing spar(s).

13. The aircraft wing torsion box according to claim 12 wherein the front spar has a first end associated with the connecting portion and a second end remote from the connecting portion, wherein the supporting member further comprises a flange extending forward from the second end of the front spar, the rear spar has a first end associated with the connecting portion and a second end remote from the connecting portion, the supporting member further comprising a flange extending rearwards from the second end of the rear spar, the front and rear spar flanges being located above the first ends of the respective spars, wherein said upper wing skin portion extends across the front and rear flanges.

14. The aircraft wing torsion box according to claim 11 comprising two upper wing skin portions, a first extending from the front spar to an adjacent spar, and a second upper wing skin portion extending from the rear spar to an adjacent spar.

15. The aircraft wing torsion box according to claim 11 comprising a lower wing skin portion extending from a first interposing spar to a second interposing spar, the support member comprising two lower bridging portions adjacent to the lower wing skin portion, one either side of the lower wing skin portion, the two lower bridging portions providing an external structural wing surface.

16. The aircraft wing torsion box according to claim 1, wherein the portion of the support member forming the upper or lower external structural surface is included in the connecting portion of the support member.

17. The aircraft wing torsion box according to claim 1 comprising one or more braces which extend between adjacent spars, one or more of the braces comprising a substantially planar, flat portion extending between adjacent spars, the substantially planar, flat portion optionally being substantially orthogonal to the support member.

18. The aircraft wing torsion box according to claim 1 wherein the supporting member is formed from composite material.

19. An aircraft wing or an aircraft comprising an aircraft wing torsion box according to claim 1.

20. The aircraft wing torsion box according to claim 1, wherein the support member includes a layer continuous through the front spar, the rear spar, and the connecting portion.

21. An aircraft wing torsion box including a front associated with a leading portion of the wing torsion box and a rear associated with a trailing portion of the wing torsion box, the wing torsion box further comprising:
a support member including a front spar and a rear spar, and a connecting portion between the front and rear spars, the connecting portion comprising at least one interposing spar,
at least one portion of upper wing skin;
at least one portion of lower wing skin,
at least one portion of the upper wing skin and at least one portion of the lower wing skin being supported by the support member, and
at least one upper wing skin portion which extends between adjacent spars and at least one lower wing skin portion which extends between adjacent spars;
wherein the at least one upper wing skin portion or the at least one lower wing skin portion is supported by the front, rear and interposing spar(s), and
wherein the front spar has a first end associated with the connecting portion and a second end remote from the connecting portion, the supporting member comprising a flange extending forward from the second end of the front spar, the rear spar has a first end associated with the connecting portion and a second end remote from the connecting portion, the supporting member comprising a flange extending rearwards from the second end of the rear spar, the front and rear spar flanges being located above the first ends of the respective spars, wherein said upper wing portion is does not extend across the front and rear spars, the front and rear spars forming an external structural surface of the wing.

22. An aircraft wing comprising a support member which includes a front spar, a rear spar, and a connecting portion between the front and rear spars, wherein the connecting portion includes at least one interposing spar;
at least one portion of an upper wing skin; and
at least one portion of a lower wing skin;
the at least one portion of the upper wing skin and the at least one portion of the lower wing skin being supported by the support member;
wherein a portion of the support member forms an upper or lower external structural surface of the aircraft wing, and the portion is uncovered by the upper wing skin and by the lower wing skin, and
wherein the at least one interposing spar spans between the upper wing skin and the lower wing skin.

23. The aircraft wing torsion box according to claim 22, wherein the support member includes a layer continuous through the front spar, the rear spar, and the connecting portion.

24. An aircraft wing torsion box comprising:
an upper skin and a lower skin; and
a support member formed of a composite material and includes bridging members, a front spar, a rear spar and interposing spars, wherein each of the spars extends between and attaches to the upper skin and the lower skin,
wherein a least one of the bridging members is flush with an outer surface of the upper skin or an outer surface of the lower skin, and
wherein the bridging members each extend between adjacent ones of the front spar, the rear spar and the interposing spars.

25. The aircraft wing torsion box as in claim 24 wherein the support member is an integral single piece component.

26. The aircraft wing torsion box of claim 24 wherein the front and rear spars are vertical and the interposing spars are oriented at an angle in a range between 25 to 35 degrees of vertical.

27. The aircraft wing torsion box of claim 24 wherein the upper skin and the lower skin each have an edge seated in a recess of the supporting member aligned with the upper skin or lower skin.

* * * * *